2,835,647

STABILIZATION OF ACRYLIC NITRILE POLYMER COMPOSITIONS TO HEAT

Roger M. Schulken, Jr., and Ralph E. Boy, Jr., Kingsport, Tenn., assignors to Eastman Kodak Company, Rochester, N. Y., a corporation of New Jersey No Drawing. Application July 9, 1953
Serial No. 367,109

1 Claim. (Cl. 260—45.9)

The present invention relates to polymers and copolymers of acrylic nitriles, e. g. acrylonitrile and methacrylonitrile. More particularly, the invention is concerned with the stabilization of these polymers to heat and to stabilizers therefor.

One distinct stabilization problem in the acrylic nitrile polymer field is presented by polymer solutions in solvents such as N,N'-dimethylformamide. These polymers which otherwise would discolor badly at normal solution forming temperatures in the range of 100°–150°, due to the interaction of the solvent and amine impurities contained therein with the polymer itself, have been found to be stabilized against such discoloration by the addition of acidic materials in small amounts. This problem and the particular methods employed to overcome it are discussed in, for instance, Coover et al. Patents No. 2,503,244 and 2,503,245, issued April 11, 1950, and Scheiderbauer Patent No. 2,502,030, issued March 28, 1950.

A second problem of discoloration and degradation of acrylic nitrile polymer compositions is encountered when elevated temperatures are employed in the treatment of solid polymer compositions containing no solvent. For injection and compression molding of acrylic nitrile polymeric materials, the normal molding temperature usually is in the range 150°–250° C. at which the polymers quite generally are unstable even in the absence of solvents. Upon being heated, the compositions become discolored and the color may change progressively from yellow to red then to black. Sometimes the polymers appear to develop cross linking and poor flow properties as a result of exposure to normal molding temperatures.

We now have found that adequate stability in the molding temperature range can be provided for acrylic nitrile polymers without the production of haze effects if certain amine compositions are employed as the stabilizing agents. According to our discovery, if certain acid salts of amines are incorporated into the nitrile polymer not only is the stability of the polymer to heat improved, but the resulting composition produces a clear plastic which is free from haze. This apparently is due to the compatibility of the resin and the amine salts of the invention. The amine salt stabilizers can be used in higher concentrations than the acid materials without deleterious effects. Accordingly, a greater reservoir of absorbent for resin degradation products is made available. The resin-stabilizer system thus has an adequate supply of acid stabilizer and the acid is furnished as needed to provide a longer term of stabilization.

It therefore is an object of the present invention to provide a new class of materials useful to stabilize solid (i. e. undissolved) acrylic nitrile polymer compositions against the effects of molding temperatures, i. e. temperatures in the range of 150°–250° C. It is another object of the invention to provide new stable compositions of acrylic nitrile polymers, e. g. polyacrylonitrile, polymethacrylonitrile, copolymers of acrylonitrile and copolymers of methacrylonitrile. Still another object of the invention is to provide resinous acrylic nitrile compositions resistant to breakdown and discoloration at molding temperatures and which may be molded to form substantially colorless haze-free specimens. A further object of the invention is to provide compositions of the defined type without producing other deleterious effects on the properties of the molded specimens. Additional objects will be obvious from the accompanying specification and claim.

In accordance with the present invention, acrylic nitrile polymers are stabilized by the incorporation therein of certain acid salts of amines. By acrylic nitrile polymers is meant homopolymers of acrylic nitriles and copolymers of acrylic nitriles with other unsaturated materials copolymerizable therewith, the copolymers containing at least 15% by weight of the acrylic nitrile. The invention is particularly useful in connection with the stabilization to heat of polymethacrylonitrile and polyacrylonitrile. The invention contemplates the use of amine salts prepared from acids and amines having properly balanced ionic strengths.

The amine salts provided by the invention are those of strong acids and weak amine bases, the two being chosen so that the acid is relatively stronger than the base. An acid which is too strong seems to accelerate degradation while we have observed that a weak one is not effective. An amine that is too strong and not balanced by a sufficiently strong acid also appears to accelerate degradation. That is to say, an improperly selected material not only fails to improve stabilization but generally accelerates failure. However, a strong acid such as sulfuric acid (ionization constant of greater than $10^{-1}$) can be used with fairly strong amines (ionization constant approximating $10^{-3}$). Relatively weak acids such as phosphoric acid (ionization constant approximating $10^{-2}$) may be used with weaker bases (ionization constant approximating $10^{-9}$). Acids weaker than phosphoric are generally not appreciably effective.

As its most advantageous embodiment, the invention contemplates the use of an amine salt prepared from an amine having an ionization constant in the range of about $10^{-10}$ to $10^{-13}$ and an acid having an ionization constant in the range of at least about $10^{-3}$ to 0.5, the ionization constant of the acid being substantially higher than that of the amine. The preferred embodiment of the invention contemplates the use as stabilizers for acrylic nitrile polymers of the amine salts pyridine phosphate, and diethyl amine sulfate.

The stabilized polymer compositions of the invention contain stabilizer in the amount of 0.2% to 1.5% and are prepared by dissolving the stabilizer in a suitable solvent, e. g. alcohol in which the polymer is insoluble, thoroughly mixing the stabilizer solution with finely divided polymer and evaporating the solvent to obtain a uniform solid mixture of polymer and stabilizer. The composition may includue a normal content of plasticizer.

The invention is illustrated in the following examples:

EXAMPLE 1

A number of 10-g. samples of polymethacrylonitrile powder (through 20 mesh) were thoroughly mixed with solutions (methanol or water) of various stabilizers in such a way that 0.1 g. of stabilizer was included in each sample (1%). The solvent was evaporated and the remaining powder was pressed between heated platens to 0.050 inch thick sheets. Portions were cut from the center of the sheets and heated uniformly at 170° C. for four hours. The effect of the stabilizer was determined by noting the color and condition of the heated specimen.

The results of a number of these tests are shown in the following table.

*Effect of stabilizers on heating of polymethacrylonitrile*

| | Ionization Constant Acid (approx.) | Ionization Constant Amine (approx.) | Color of Heated Specimen |
|---|---|---|---|
| 1. None (control) | | | Red. |
| 2. Pyridine phosphate | $10^{-3}$ | $10^{-9}$ | Light yellow. |
| 3. Diethylamine phosphate | $10^{-2}$ | $10^{-3}$ | Black. |
| 4. Diethylamine sulfate | $>0.4$ | $10^{-3}$ | Light yellow. |
| 5. Aniline sulfate | $>0.4$ | $10^{-10}$ | Do. |
| 6. Pyridine acetate | $>10^{-5}$ | $10^{-9}$ | Red. |
| 7. Diethylamine acetate | $10^{-5}$ | $10^{-3}$ | Black. |
| 8. Ethanolamine phosphate | $10^{-2}$ | $\sim 10^{-3}$ | Do. |
| 9. Morpholine phosphate | $10^{-2}$ | $\sim 10^{-3}$ | Red. |
| 10. β-Naphthylamine phosphate | $10^{-2}$ | $10^{-10}$ | Very light yellow. |
| 11. β-Naphthylamine sulfate | $>0.4$ | $10^{-10}$ | Do. |
| 12. Methyl hydrazine sulfate | $>0.4$ | $\sim 10^{-6}(?)$ | Black. |
| 13. N,N'-diphenyl benzamidine sulfate | $>0.4$ | | Red. |
| 14. 2,3-Dimethylaniline sulfate | $>0.4$ | $10^{-9}$ | Light yellow. |
| 15. Ethomeen 18/15 sulfate | $>0.4$ | $10^{-3}$ | Do. |
| 16. Ethomeen C/60 sulfate | $>0.4$ | $10^{-3}$ | Do. |
| 17. Armeen 8D sulfate | $>0.4$ | $10^{-3}$ | Do. |
| 18. Armeen T sulfate | $>0.4$ | $10^{-3}$ | Do. |

The "Armeen" and "Ethomeen" compositions are described in two booklets issued by Armour Chemical Division, Armour and Company, 1355 W. 31st Street, Chicago 9, Illinios, as follows: "The Chemistry of Fatty Amines" (copyrighted 1948), and "Ethomeens, Ethomids, Ethofats" (subtitled "New Cationic and Non-Ionic Emulsifiers, Detergents, Wetting Agents, Intermediates" and copyrighted 1949).

As will be seen from pages 1 and 3 of the booklet "Ethomeens, Ethomids, Ethofats," the Ethomeens are a class of tertiary amines of the formula

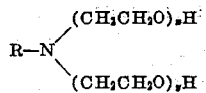

wherein R is a fatty alkyl group. For Ethomeen c/60, the fatty alkyl portion is a Coco amine, the ethylene oxide portion is 50 mols, and the specific gravity is 1.100. For Ethomeen 18/15, the fatty acid portion is stearyl amine, the ethylene oxide portion is 5 mols, and the specific gravity is 0.984.

As will also be seen from Table 1, page 3 of the booklet "The Chemistry of Fatty Amines," the Armeens are a mixture of high molecular weight, normal, primary, aliphatic amines. Armeen 8D has 3% hexyl amine, 90% octyl amine, and 7% decylamine, and has a melting point of −13° C., a content of 97% primary amine by titration, a mean molecular weight of primary amine content of 129, and a combining molecular weight of 133. Armeen T has 30% hexadecyl amine, 25% octadecylamine, and 45% octadecenyl amine, having a melting point of 46° C., a content of 85% primary amine by titration, a mean molecular weight of primary amine content of 263, and a combining molecular weight of 310.

EXAMPLE 2

A copolymer was prepared by polymerizing together 70 parts of methacrylonitrile and 30 parts of ethyl acrylate. Stabilizers consisting of diethyl amine sulfate, pyridine phosphate, β-naphthylamine phosphate, β-naphthylamine sulfate, aniline sulfate, and 2,3-dimethyl aniline sulfate were each added to samples of the polymer thus prepared, the stabilizers being incorporated in amounts of about 1% by weight. The compositions were tested for heat stability by the preparation of sheets and heating as described in Example 1. All compositions were found to be relatively stable in that no appreciable discoloration or degradation was observed.

EXAMPLE 3

Samples of a copolymer of acrylonitrile and α-methylstyrene (1–2 by weight) were tested with the stabilizers listed in Example 2. The results tabulated indicated only slight discoloration in comparison with heavy discoloration obtained in samples treated without incorporation of stabilizer.

EXAMPLE 4

About one percent pyridine phosphate was incorporated into a sample (25 g.) of polymethacrylonitrile. A portion was molded to a light yellow clear button. A similar molding of the unstabilized resin was red in color.

We claim:

In a method of molding at an elevated temperature a normally solid and rigid thermoplastic polymeric composition wherein its solid and rigid character results essentially from the presence therein of a polymeric material selected from the group consisting of (1) polyacrylonitrile, (2) polymethacrylonitrile, (3) a copolymer of acrylonitrile with α-methylstyrene, and (4) a copolymer of methacrylonitrile with ethyl acrylate, the improvement which consists of performing said molding at a temperature of from about 150° to about 250° C. upon said thermoplastic polymeric composition which contains from about 0.2 to about 1.5% by weight of a heat stabilizer selected from the group consisting of pyridine phosphate, β-naphthylamine sulfate and β-naphthylamine phosphate, whereby the molded solid and rigid polymeric composition produced as a result of said improved method is clear, free from haze and substantially free from discoloration.

References Cited in the file of this patent

UNITED STATES PATENTS

| 2,533,224 | Cresswell | Dec. 12, 1950 |
| 2,654,679 | Goppel et al. | Oct. 6, 1953 |
| 2,662,875 | Chaney | Dec. 15, 1953 |
| 2,671,066 | Justice | Mar. 2, 1954 |